(12) United States Patent
Solenthaler et al.

(10) Patent No.: US 12,508,666 B2
(45) Date of Patent: Dec. 30, 2025

(54) ULTRASONIC BOOSTER AND DEVICE FOR PROCESSING WORKPIECES

(71) Applicant: Telsonic Holding AG, Bronschhofen (CH)

(72) Inventors: Peter Solenthaler, St. Margarethen (CH); Albert Büttiker, Mosnang (CH); Pascal Büchel, Sirnach (CH)

(73) Assignee: Telsonic Holding AG, Bronschhofen (CH)

( * ) Notice: Subject to any disclaimer, the term of this patent is extended or adjusted under 35 U.S.C. 154(b) by 120 days.

(21) Appl. No.: 18/551,013

(22) PCT Filed: Mar. 19, 2021

(86) PCT No.: PCT/EP2021/057042
§ 371 (c)(1),
(2) Date: Sep. 18, 2023

(87) PCT Pub. No.: WO2022/194383
PCT Pub. Date: Sep. 22, 2022

(65) Prior Publication Data
US 2024/0165735 A1 May 23, 2024

(51) Int. Cl.
*B23K 20/00* (2006.01)
*B23K 20/10* (2006.01)

(52) U.S. Cl.
CPC .................. *B23K 20/106* (2013.01)

(58) Field of Classification Search
CPC .................. B23K 20/106; B23K 20/10; H01L 2224/85205
See application file for complete search history.

(56) References Cited

U.S. PATENT DOCUMENTS

| | | | |
|---|---|---|---|
| 4,663,556 A * | 5/1987 | Kumada | H02N 2/0045 310/333 |
| 5,662,766 A | 9/1997 | Ishikawa et al. | |
| 8,836,200 B2 * | 9/2014 | Young | A61B 17/320068 310/323.02 |

(Continued)

FOREIGN PATENT DOCUMENTS

| | | |
|---|---|---|
| EP | 1 103 238 A1 | 5/2001 |
| EP | 3 822 018 A1 | 5/2021 |

(Continued)

OTHER PUBLICATIONS

JP2015-123481A computer english translation (Year: 2015).*

(Continued)

*Primary Examiner* — Erin B Saad
(74) *Attorney, Agent, or Firm* — Finch & Maloney PLLC (57) ABSTRACT

The invention relates to an ultrasonic booster (1) for a sonotrode (30) for processing workpieces (W) with ultrasonic vibrations, having a booster body (10). Longitudinal vibrations (SL) are introduced into the booster body (10) on a sound introduction side (11) having a first end side (12). A conversion structure (15), by means of which transverse vibrations (ST) having a vibration component in a plane (E) perpendicular to the longitudinal axis (L) are generated from the longitudinal vibrations (SL), is located between the sound introduction side (11) and a coupling side (13) opposite the sound introduction side.

20 Claims, 5 Drawing Sheets

(56) References Cited

U.S. PATENT DOCUMENTS

| | | |
|---|---|---|
| 8,840,005 B2 | 9/2014 | Lang et al. |
| 10,137,033 B2* | 11/2018 | Clayton .................. G06F 30/23 |
| 11,345,553 B2* | 5/2022 | Lu .......................... B06B 1/0611 |
| 11,376,627 B2* | 7/2022 | Miura .................. B23K 20/106 |
| 2001/0011176 A1 | 8/2001 | Boukhny |
| 2003/0125620 A1* | 7/2003 | Satou ...................... B06B 3/00 600/437 |
| 2006/0004396 A1* | 1/2006 | Easley ............... A61B 17/1659 606/169 |
| 2007/0080193 A1* | 4/2007 | Kakutani ................ H01L 24/78 228/101 |
| 2009/0236938 A1* | 9/2009 | Bromfield ............. B06B 1/0611 310/323.19 |
| 2010/0320257 A1* | 12/2010 | Buttiker ............... B23K 20/106 228/110.1 |
| 2011/0278988 A1* | 11/2011 | Young ....................... B06B 3/00 310/328 |
| 2018/0245958 A1* | 8/2018 | Bezdek .................. B06B 1/0666 |
| 2018/0345318 A1* | 12/2018 | Miura ....................... B06B 3/00 |
| 2023/0130690 A1* | 4/2023 | Aragón .................. G01F 1/667 73/861.18 |

FOREIGN PATENT DOCUMENTS

| | | |
|---|---|---|
| WO | 94/23935 A1 | 10/1994 |
| WO | 95/23668 A1 | 9/1995 |
| WO | 2012/069413 A1 | 5/2012 |

OTHER PUBLICATIONS

International Search Report Corresponding to PCT/EP2021/057042 mailed Dec. 10, 2021.

Written Opinion Corresponding to PCT/EP2021/057042 mailed Dec. 10, 2021.

* cited by examiner

Fig. 6

ULTRASONIC BOOSTER AND DEVICE FOR PROCESSING WORKPIECES

The invention relates to an ultrasonic booster and a device for processing workpieces having the features of the generic terms of the independent patent claims.

It is known to process workpieces by introducing ultrasonic vibrations. Typical applications are the joining of workpieces by welding, the cutting out of workpieces or the treatment of powders, such as in sieving.

Ultrasonic vibrations are generated by a converter that oscillates in a longitudinal direction. For joining workpieces, in particular workpieces made of metal or plastic, it is known to introduce ultrasonic vibrations into the workpieces in a direction parallel to their surface.

From WO 95/23668 a process and a device for welding metal parts are known, in which a sonotrode body is set into torsional vibrations. A disadvantage of this arrangement is that despite the torsional vibration generated, longitudinal components are still present, which can lead to damage to the workpiece or to undesirable damping.

The generation of torsional vibrations by introducing longitudinal vibrations is furthermore also known from U.S. Pat. Nos. 4,663,556, 5,662,766, EP 1 103 238, US 2006/004396 or US 2011/278988.

In WO 2012/069413 A1 it was therefore proposed to design and excite a sonotrode in such a way that the entire sonotrode can be excited to a torsional vibration with a negligibly small longitudinal vibration component. For this purpose, vibrations are introduced tangentially to the sonotrode body. With this solution, longitudinal components can be avoided, and good welding results can be achieved. However, the design is relatively complex.

Furthermore, sonotrodes are wear parts. The insertion of conversion structures in the sonotrode is complex and therefore leads to unnecessarily high costs for a wear part.

It is therefore the object of the present invention to avoid the disadvantages of the known, and in particular to provide an ultrasonic component and a device and a process for machining workpieces, in which a vibration can be generated in a direction parallel to the surface of the workpiece with as small a longitudinal component as possible, which can be manufactured simply and inexpensively, and which are reliable in operation.

According to the invention, these objects are solved with an ultrasonic booster and a device having the features of the characterizing parts of the independent claims.

The ultrasonic booster according to the invention is used to excite a sonotrode for processing workpieces with ultrasonic vibrations. The ultrasonic booster has a booster body with a longitudinal axis. The booster body has a sound input side and a coupling side. The sound input side is provided with a first end face. The coupling side is provided with a second end face.

On the sound input side, longitudinal vibrations can be introduced into the booster body in a direction parallel to the longitudinal axis.

The second end face is used to connect the ultrasonic booster to a sonotrode.

A conversion structure is arranged between the sound input side and the coupling side. The conversion structure can be used to generate transverse vibrations with a vibration component in a plane perpendicular to the longitudinal axis from the introduced longitudinal vibrations.

According to the invention, torsional vibrations can thus be generated in a simple manner from longitudinal vibrations and transferred to a sonotrode. Because the conversion structure is arranged in a booster, a sonotrode can be easily exchanged or replaced. Especially in the case of wear or when using several sonotrodes with different processing surfaces for one workpiece, it is therefore sufficient to arrange the conversion structures in only one component, i.e., the booster.

Preferably, a damping structure is provided between the conversion structure and the coupling side. The damping structure is designed to reduce the longitudinal vibrations on the coupling side.

In the conversion structure, the introduced longitudinal vibrations are converted to transverse vibrations in a manner known per se (see, for example, WO 95/23668).

The damping structure ensures that longitudinal vibrations are not transmitted to the coupling side, or at most to a negligible extent. The damping structure is designed in such a way that, viewed in the torsional direction, the damping is as low as possible so that the torsional vibrations are transmitted to the coupling side as undamped as possible.

According to a preferred embodiment, the booster body is designed as a hollow body. However, it is also conceivable to design the booster body partially or completely as a full body. In particular, a hollow body or a full body may also be preferred, depending on the planned application.

The ultrasonic booster is preferably provided with a connection interface on the coupling side, in particular with a thread, for connection to the sonotrode. A threaded connection makes it particularly easy to connect a sonotrode to the ultrasonic booster.

The ultrasonic booster also preferably has, in particular adjacent to the sound input side, a contour for a tool for connecting the ultrasonic booster to the sonotrode. Typically, this is a hexagonal contour. This allows the ultrasonic booster to be connected to the sonotrode in a simple manner using a conventional hexagonal wrench.

Preferably, the booster body is otherwise rotationally symmetrical, in particular with a circular or annular cross section.

Torsion sonotrodes can be used, for example, for welding plastic parts or metal parts. Typical applications could be the welding of plastic sensor holders into automobile bumpers or the welding of metallic strands to each other or of strands to connecting parts. In principle, however, the application of the ultrasonic booster according to the invention is not limited to certain fields of application.

If the booster body is rotationally symmetrical and in particular circular, it typically has a diameter of less than a quarter of the longitudinal wavelength, i.e., at a frequency of 20 kHz typically less than 60 mm, preferably less than 50 mm and particularly preferably about 25 mm to 35 mm. It has been shown that particularly stable vibration behavior can be achieved with such, relatively small diameters. Typically, ultrasonic vibrations are introduced at a frequency of 15 kHz to 50 kHz, preferably 20 kHz to 35 kHz.

The conversion structure is preferably in the form of material recesses on an outer surface of the booster body. The material recesses can extend along a helix. In particular, the material recesses can be formed in the form of conversion slots. The number of conversion slots can be in the range from 3 to 12 and is preferably 6. However, it is also conceivable to provide material recesses in the form of individual holes on a helix.

The helix can be arranged with a constant pitch or with a variable pitch. In the case of a variable pitch, the material recesses are arranged along a curve with a curvature on the outer surface of the booster body. The helix preferably has an angle of about 45° with respect to the longitudinal axis of the booster body.

Typically, the conversion structure and the damping structure are designed as separate structures that are separated from each other. However, it is also conceivable to provide a structure that continues along the axis and acts as a conversion structure in a first section and as a damping structure in a second section. In particular, in the case of conversion structures extending with a variable pitch along a curve, it is conceivable that the pitch decreases to such an extent that the structure tapers off into a region which runs in a plane approximately perpendicular to the axis and forms a damping structure there.

While a damping structure which runs in a plane perpendicular to the axis is particularly advantageous, it is not impossible for the damping structure not to run exactly perpendicular to the axis. Typically, the damping structure may extend at an angle between 85° and 95° with respect to the axis. While a damping structure with a constant pitch is advantageous, damping structures with variable pitches are also possible.

As an alternative to material recesses, it is also conceivable to form the conversion structure in the form of material accumulations on the outer surface and/or on an inner surface of the booster body. In particular, such material accumulations can be provided in booster bodies which are manufactured by additive manufacturing processes. In particular, this can be advantageous in applications where high demands are placed on hygiene. For example, such material accumulations instead of openings advantageously reduce the deposition of bacteria or the passage of bacteria or dirt in packaging applications.

The material recesses can extend through the entire wall of the booster body in the case of a hollow body. However, it is also conceivable to provide the material recesses only as depressions on the outer surface of a booster body, particularly in connection with a booster body that is not designed as a hollow body. Conversion structures with a combination of material recesses and material accumulations or combinations of material recesses of different shapes from as described above are also conceivable.

The damping structure is typically formed by a material weakening in the booster body. This can preferably be a material weakening in the form of damping slots. The damping slots extend in particular in a direction perpendicular to the longitudinal axis of the booster body. Due to the damping slots, the sound input side is connected to the coupling side only via webs arranged between the damping slots. These webs are stable and transmit the torsional vibrations. At the same time, due to the reduced or missing material in the region of the damping slots, the transmission of longitudinal vibrations from the sound input side to the coupling side is largely prevented. The damping structure has a filter function for the longitudinal vibrations, so that only vibrations with torsional components are transmitted. It is also conceivable to provide several rows of damping slots. The number of damping slots can be in the range from 3 to 12 and is preferably 6.

However, other types of damping are of course also conceivable. Instead of damping slots, other types of material weakening can be provided, for example by material processing that reduces the modulus of elasticity with respect to deformations in the longitudinal direction. It is also conceivable to form the damping structure by providing additional materials.

The conversion structure typically extends over a length in the longitudinal direction of the ultrasonic component that is about 10% to 30%, preferably about 15% to 25%, of the length of the booster body. It has been shown that with such a length, a particularly optimal conversion of longitudinal vibrations into transverse vibrations can be achieved.

Furthermore, the conversion structure is preferably arranged eccentrically between the damping structure and the first end face, closer to the first end face, when viewed in the longitudinal direction.

An intermediate region is formed between the conversion structure and the damping structure. In this intermediate region, the distribution between the proportion of longitudinal vibrations and torsional vibrations changes continuously when viewed in the longitudinal direction.

The proportions of longitudinal and torsional vibration components thus change along the longitudinal axis. The damping structure is preferably arranged in the region of an amplitude maximum of the torsional vibrations or a maximum proportion of the torsional vibrations.

The length of the intermediate region is preferably selected so that the proportion of torsional vibrations is minimized in a middle region of the damping structure. This results in particularly stable amplitudes and low frequency fluctuations.

In a preferred embodiment, a recess is also arranged in the first end face on the sound input side. The recess is provided with a coupling surface for connecting the booster body to a vibrating surface of an ultrasonic converter. In this way, an optimized coupling of the longitudinal vibrations can be achieved. In particular, an arrangement as in the pendant application EP 3 663 008 may be used, the contents of which are made the subject matter of the present application by cross-reference.

According to a further preferred embodiment, a stop flange is provided on the outer surface of the booster body in the region of the second end face for stopping against a sound input side of a sonotrode. The booster body can also have a thread for connection to a sonotrode as described above. The thread extends from this stop flange on the side opposite the conversion structure.

The booster body can typically be made in one piece and consist, for example, of steel, titanium, aluminum, or a ceramic. However, it is also conceivable to provide multi-part booster bodies. In this context, it is particularly conceivable to also use booster bodies consisting of several parts made of different materials. In particular, it is conceivable to provide an additional damping material between the coupling side and the sound input side in the region of the damping structure.

Particularly preferably, the conversion structure, the damping structure, the sound input side, the length of the booster body and the second end face are specifically matched to each other so that the direction of vibration of the torsional vibrations on one side of the damping structure is in the opposite direction to the torsional vibrations on the other side of the damping structure. A suitable dimensioning can be defined in particular by finite element calculations. In particular, a stable and thus more reliable amplitude and a small frequency variation are achieved by a sufficient stiffness of the webs in the region of the damping structure.

The invention further relates to an apparatus for processing workpieces by means of ultrasound. The device comprises at least one ultrasonic booster as described above. A sonotrode is connected, in particular screwed, to the coupling side of the ultrasonic booster at a sound input side. In addition, the device preferably has a converter for operating the ultrasonic booster and in particular for introducing longitudinal vibrations into the sound input side of the ultrasonic booster.

The device also has a receptacle for a workpiece to be processed. In addition, the device has an actuating device for moving the ultrasonic booster and the sonotrode towards the receptacle. In this way, a workpiece can be clamped between a processing surface of the sonotrode and the receptacle and subjected to ultrasound in a manner known per se.

The sonotrode can also be provided with a holder and centering for a workpiece, in particular with a spring-mounted holder. The holder and centering is preferably fixed in a local torsional vibration minimum of the sonotrode.

Finally, the invention relates to a process for machining workpieces by means of ultrasound. In particular, an ultrasonic booster with a sonotrode as described above is used. In a first step, longitudinal vibrations are introduced at a sound input side of a booster body. The introduced longitudinal vibrations are transformed by means of a conversion structure into torsional vibrations with a vibration component in a plane perpendicular to the vibration direction of the longitudinal vibrations.

These torsional vibrations are introduced into a sonotrode connected to the booster body. Preferably, the longitudinal vibrations between the conversion structure and the coupling side are reduced by means of a damping structure, in particular a longitudinal damping structure.

The invention is explained in more detail below with reference to the drawings and in embodiment. It shows.

Figure 1:
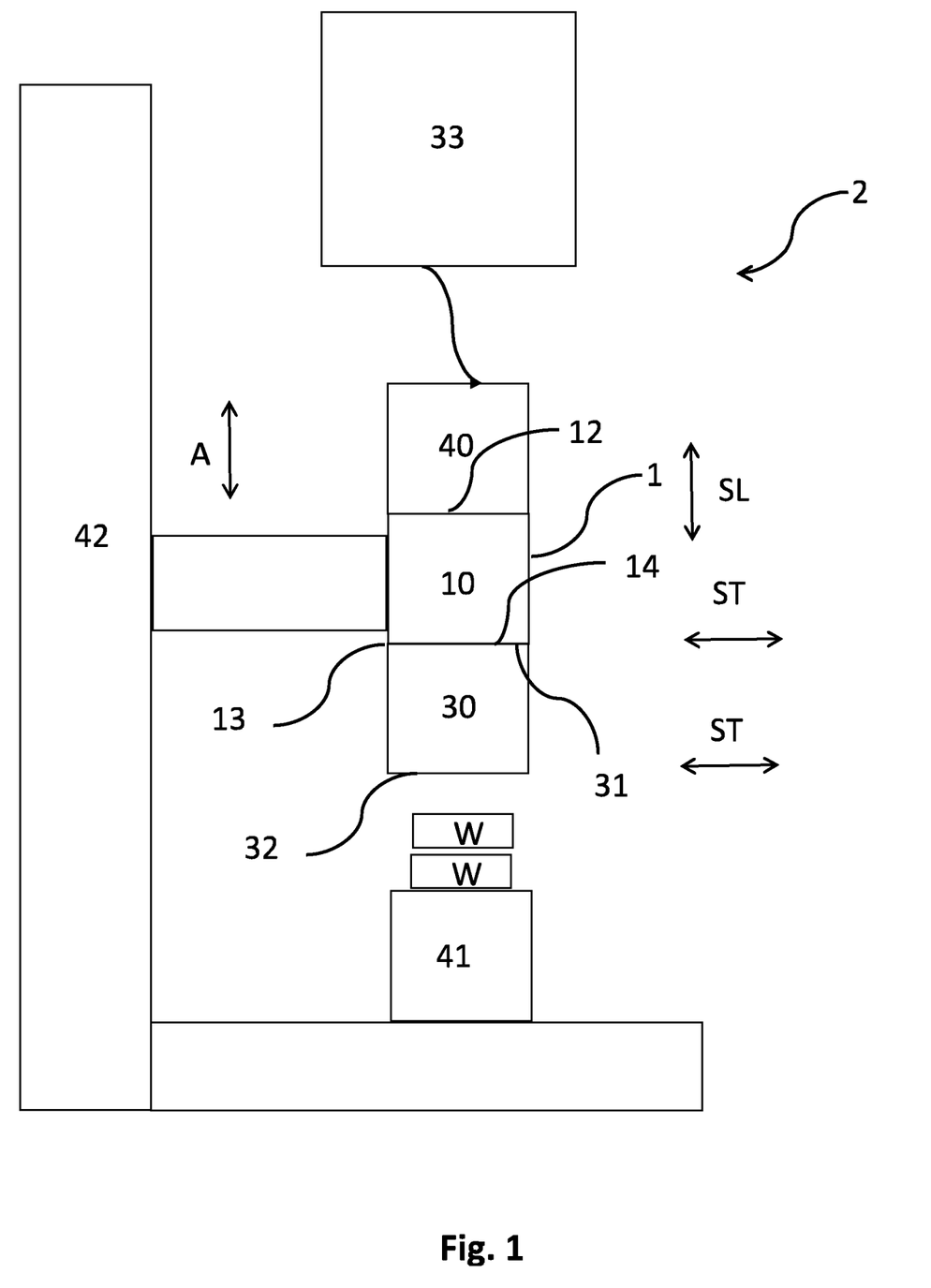
FIG. 1 a schematic view of a device according to the invention.

FIG. 1 schematically shows a device 2 for processing workpieces W. The workpieces W shown here are exemplarily two parts which are to be welded together. The device 2 has a receptacle 41 for receiving the workpieces W.

An ultrasonic booster 1 having a booster body 10 is excitable to ultrasonic vibrations by means of a converter 40. The converter 40 is excited by an ultrasonic generator 33 to longitudinal vibrations SL in a longitudinal direction. In the ultrasonic booster 1, longitudinal vibrations SL are coupled in at a first end face 12 and then converted into torsional vibrations ST, so that torsional vibrations ST are generated at a second end face 14 on a coupling side 13 of the booster body 10.

These torsional vibrations are transmitted to a sound input side 31 of a sonotrode 30. The sonotrode 30 is a torsion sonotrode and introduces torsional vibrations ST into the workpiece W.

The stack consisting of converter 40, ultrasonic booster 1 and sonotrode 30 is mounted in a machine frame and can be moved in axial direction A by means of a drive, so that the sonotrode 30 can be moved with a working surface 32 in the direction of the workpiece W. For moving the stack in axial direction A, a pneumatic drive 42 is typically provided. However, servo presses in a manner known per se are also conceivable.

Figure 2:
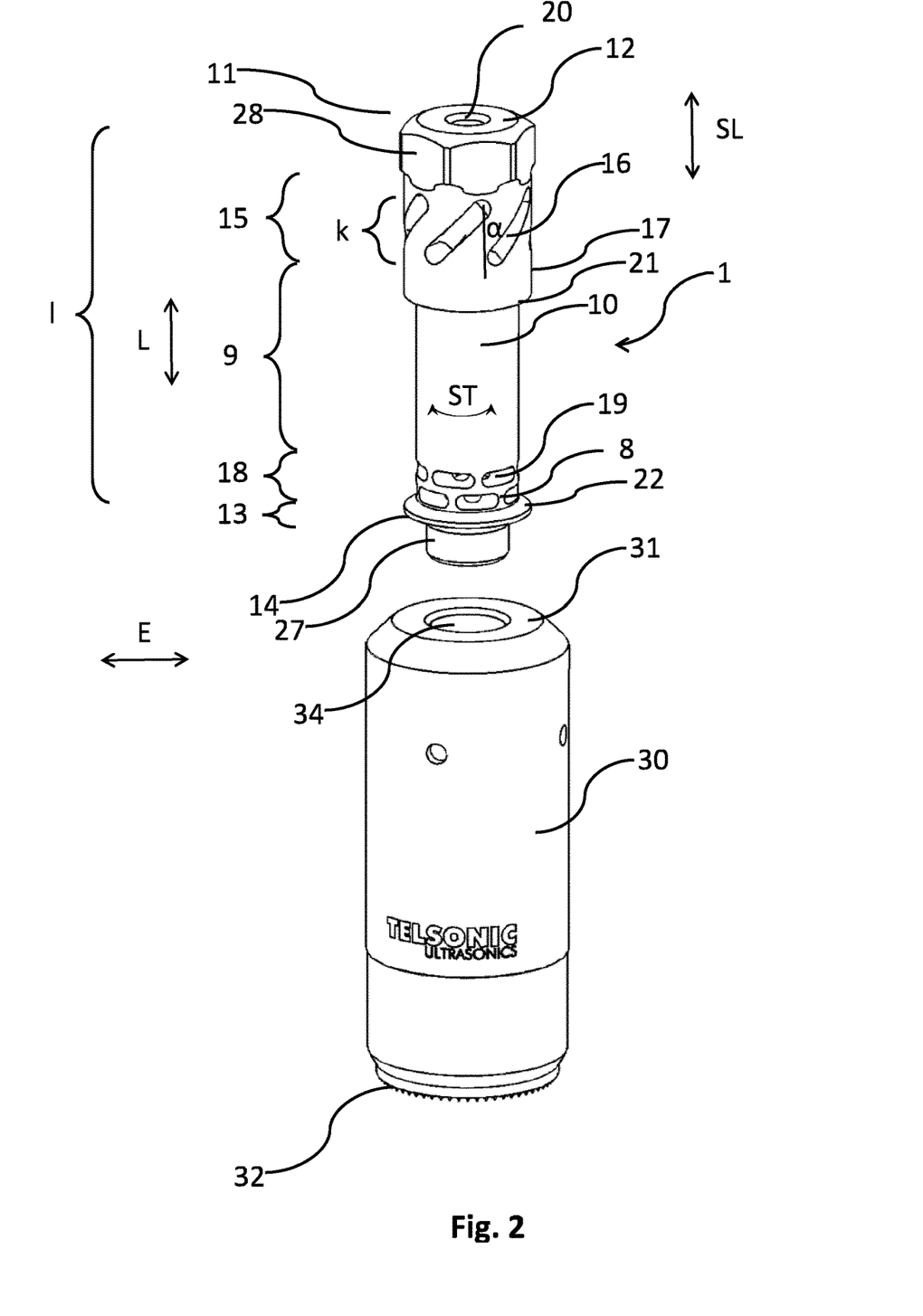
FIG. 2 a perspective view of a first ultrasonic booster according to the invention with a sonotrode.

FIG. 2 shows a perspective view of a first embodiment of an ultrasonic booster 1 according to the invention with a sonotrode 30 for use with a frequency of 35 kHz. The ultrasonic booster 1 comprises a substantially cylindrical booster body 10. The booster body 10 has a sound input side 11 with a first end face 12 and a coupling side 13 with a second end face 14. The second end face 14 is formed by a stop flange 22.

Longitudinal vibrations SL in longitudinal direction L can be introduced into the ultrasonic booster 1 at the first end face 12. For this purpose, the booster body 10 has a blind hole-like recess 20 at the first end face 12. A converter can be connected to the recess 20 so that longitudinal vibrations SL can be coupled into the ultrasonic booster 1.

The ultrasonic booster 1 also has a hexagonal contour 28 for a tool. This allows the ultrasonic booster 1 to be screwed to a sonotrode by means of a tool.

Adjacent to the sound input side 11 in the longitudinal direction L is a conversion structure 15 in the form of conversion slots 16. The conversion slots 16 are arranged on a surface 17 of the booster body 10 with an inclination at an angle α relative to the longitudinal axis L. In the embodiment shown, the booster body 10 is formed as a hollow body in the region of the conversion structure and the conversion slots 16 extend through the shell of the hollow body.

However, it is also conceivable to provide only depressions in the surface 17 and/or to design the booster body 10 as a solid body.

The conversion slots 16 cause vibrations with a torsional component ST to be generated from the longitudinal vibrations SL, which are introduced into the ultrasonic booster 1 on the sound input side 11.

In an intermediate region 9, which follows the conversion structure 15 in the longitudinal direction L, there are vibrations with both longitudinal and torsional vibration components. The proportion of the individual vibration components SL and ST varies in the longitudinal direction L.

A damping region 18 adjoins the intermediate region 9. The damping region 18 is formed by two rows of damping slots 19 which extend in the circumferential direction along a surface 17 of the booster body 10. The slots 19 are arranged regularly around the circumference of the booster body 10 and are separated from one another by webs 8 extending in the longitudinal direction (see also FIG. 6).

Seen in longitudinal direction L, after the damping structure 18, the coupling side 13 with the stop flange 22 is arranged. The webs 8 connect the intermediate region 9 with the coupling side 13. Via the webs 8, torsional vibration components are transmitted to the coupling side 13, so that the latter vibrates almost exclusively with torsional vibrations ST. There are hardly any vibrations in the longitudinal direction L on the coupling side 13. The torsional vibrations ST run in a plane E perpendicular to the longitudinal axis L.

Adjacent to the stop flange 22 in the longitudinal direction L is a thread 27 for connection to the sonotrode 30.

The sonotrode 30 is designed in a manner known per se. It has an internal thread 34 on a sound input side 31 for connection to the external thread 27 of the ultrasonic booster 1.

The dimensions of the booster body and, in particular, of the conversion slots 16 and the damping slots 19 as well as their arrangement on the booster body 10 are selected in such a way that particularly stable amplitudes and low frequency fluctuations result at the planned excitation frequency. The torsional and longitudinal frequencies should overlap as far as possible.

In particular, the damping slots 19 should be dimensioned and positioned such that a phase reversal of the torsional vibrations occurs in a central region of the damping structure 18, i.e., a torsional vibration minimum exists. Typically, the booster body 10 can be dimensioned as follows.

The booster body 10 has (without the protruding thread 27) a length 1 which is determined as a function of material and frequency. In the embodiment shown here (which represents real proportions), the length 1 is less than half a longitudinal wavelength.

The conversion slots 16 do not overlap when viewed in the circumferential direction and run at an angle of preferably 45°. Depending on the number of conversion slots 16, they therefore have a length k in the longitudinal direction L which is approximately in the range from D/6 to 3D, with 6 conversion slots 19 approximately D/2, where D is the outer diameter of the booster body 10. In the embodiment shown here, the length k is about 15% of the total length 1 of the booster body 10. The conversion slots 16 run on helical lines at an angle α of about 45° with respect to the longitudinal axis L. However, the helical line may also have a variable pitch, so that the angle α is not the same at every point of the conversion slots 16.

In the embodiment according to FIG. 2, the intermediate region 9 typically has a length greater than one quarter of the torsional wavelength.

The length of the damping structure 18 is selected to provide sufficient elasticity and thus sufficient damping.

The conversion slots begin at a distance from the surface 12 that is approximately equal to the distance k.

The coupling side 13 excluding the thread 27 is designed to be short so that the torsional amplitude in the region of the stop flange 2 is as high as possible.

The conversion slots 16 typically begin at a distance of approximately one-eighth of the longitudinal wavelength from the first surface 12.

Viewed in longitudinal direction L, the damping slots 19 typically have a height h (see FIG. 6) of 1 mm to 10 mm. Similar dimensions also apply to the following embodiments.

Figure 3:
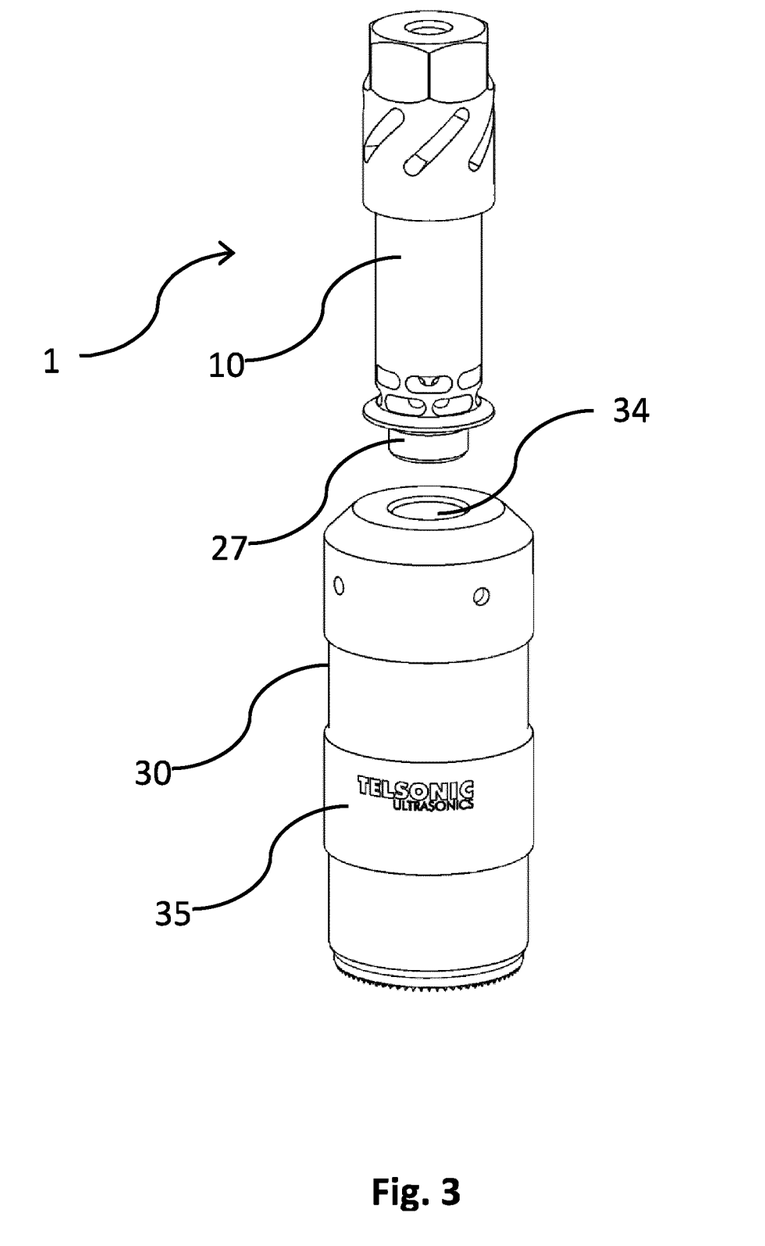
FIG. 3 a perspective view of a second ultrasonic booster according to the invention with a sonotrode.

FIG. 3 shows a second embodiment of an ultrasonic booster 2 with a sonotrode 30 for use with ultrasonic frequencies of 30 kHz in a perspective view. Identical reference signs indicate identical components. In contrast to the embodiment according to FIG. 2, the booster body 10 and the sonotrode 30 are longer and thicker. The sonotrode 30 is also provided with an additional vibrating mass 35 for adaptation to the vibration frequency and amplitude.

The booster body 10 according to FIGS. 2 and 3 is designed as a hollow body. The booster body 10 has a circular cross section. The cross section has a variable outer diameter. The outer diameter in the region of the conversion structure 15 is slightly larger than in the intermediate region 9. A step 21 serves to adjust the elasticities and to reduce the stiffness. The conversion slots 16 and the damping slots 19 extend through the entire wall of the hollow cylindrical booster body 10.

In the embodiment according to FIGS. 2 and 3, six damping slots 19 are arranged as seen in the circumferential direction. In this embodiment, the length of the damping slots 19 in the circumferential direction is greater than the length of the webs 8. The webs 8 and the damping slots 19 each extend together over an angular range of about 60°, with the slots extending over about 50° and the webs 8 over about 10°. The centers of the first row of damping slots 19 are aligned in the direction of the longitudinal axis L with the centers of the conversion slots 16. The second row of damping slots is offset by 30° with respect to the first row of damping slots, so that the webs 8 of the first row of damping slots 19 are located in the center of the damping slots 19 of the second row. In alternative embodiments, the aforementioned centers can of course also be offset from one another with respect to the longitudinal axis L.

Figure 4:
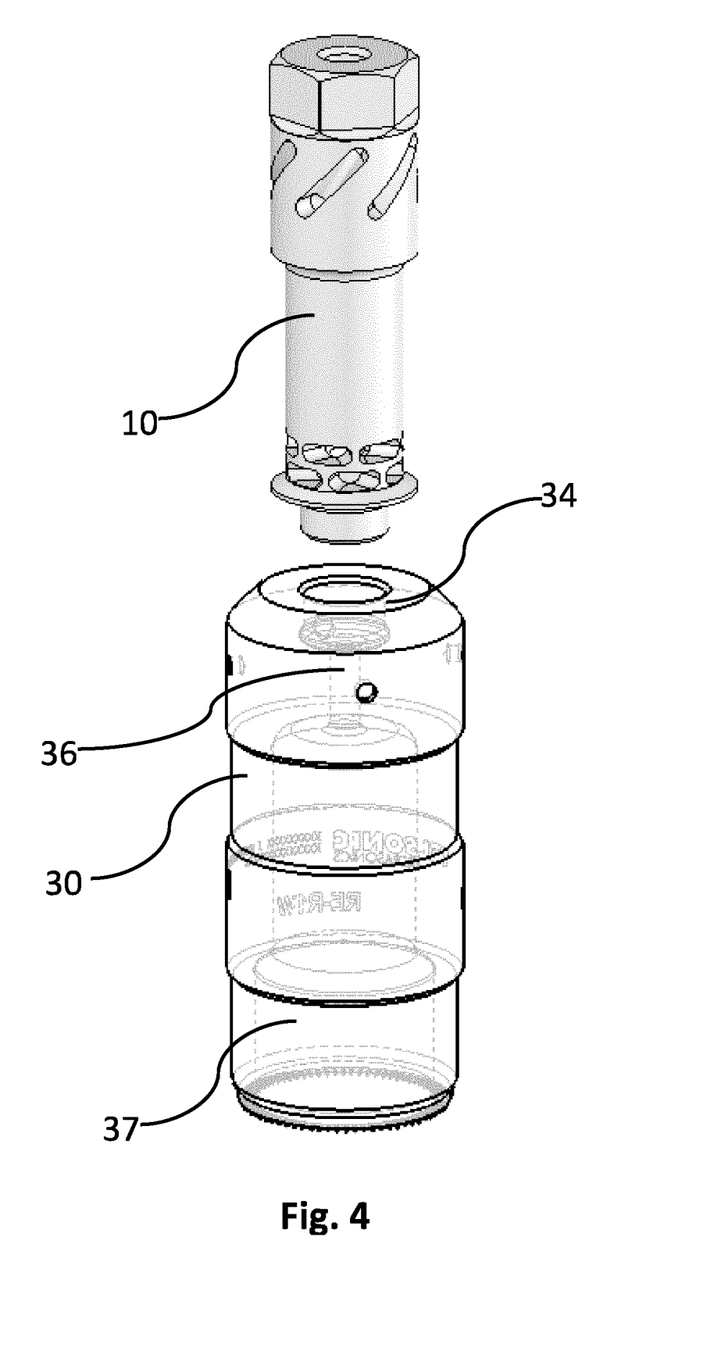
FIG. 4 a partially transparent perspective view of the embodiment according to FIG. 3.

FIG. 4 shows the embodiment according to FIG. 3 in a partially transparent representation. The sonotrode 30 is designed as a hollow body and has a through bore. Seen in longitudinal direction L, a threaded bore 36 with a smaller inner diameter adjoins the inner thread 34. Adjacent to the inner bore 16, the sonotrode 30 has a bell-shaped recess 37. The threaded bore 36 is arranged in a torsional vibration node. It serves to receive a centering and holding device for a workpiece W to be machined. Such a centering and holding device may be designed, for example, as shown in DE 10 204 212 313 (the contents of which are incorporated by cross-reference into the present application) and provide a resilient mounting for a workpiece.

Figure 5A:
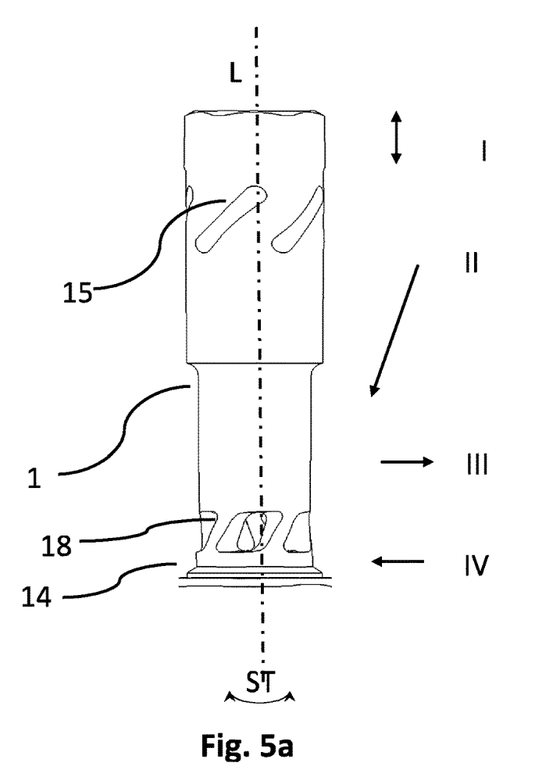
FIG. 5a/b a schematic representation of the vibration behavior of an ultrasonic booster according to the invention.
Figure 5B:
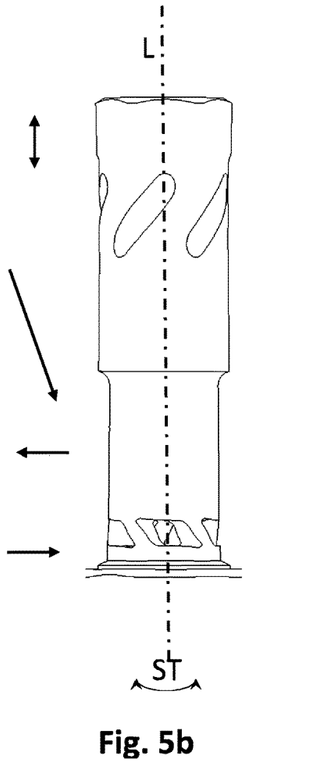

FIGS. 5a and 5b show the vibration behavior of a further embodiment of a sonotrode 30 which is excited to torsional vibrations ST by an ultrasonic booster 1 according to the invention. In contrast to the embodiments according to FIGS. 2-4, the ultrasonic booster 1 shown here has only one row of damping slots 19. The torsional vibrations ST exhibit a tangential direction of vibration about the longitudinal axis L. The distribution of the longitudinal and torsional components depends on the arrangement and size of the conversion slots 16 and the damping slots 19. The conversion slots 16 and the damping slots 19 are specifically arranged to achieve the most stable vibration behavior possible. FEM calculations can be used to determine the vibration response on the booster body 10. FIGS. 5a and 5b show two FEM calculations, each with maximum torsional amplitude of the ultrasonic booster 1 in the region of the second end face 14. The direction of vibration at the respective point in time is shown schematically by means of arrows.

Viewed in longitudinal direction L, longitudinal vibrations prevail in a first section I.

Due to the conversion structure 15, vibrations with torsional and longitudinal components are present in a second section II (symbolized by an oblique arrow), with the torsional components increasing when viewed in longitudinal direction L.

In section III just above the damping structure 18, torsional vibration components predominate.

Due to the specific arrangement of the conversion structure 15 and the damping structure 18, the direction of vibration of the torsional vibrations is deflected in the region of the damping structure 18. There is a phase reversal in a middle region. The torsional vibrations in region IV occur in the opposite direction to the vibrations in region III. In this way, a very stable vibration situation is achieved. In the region of the front side 14 of the ultrasonic booster 1, almost only torsional vibrations are present, so that the sonotrode is excited to almost pure torsional vibrations.

The sonotrodes of FIGS. 2 to 5 are typically used for welding plastic parts when the parts are brought into contact with a working surface 32. The working surface 32 is formed in a manner known per se and can, for example, have a corrugation.

Figure 6:
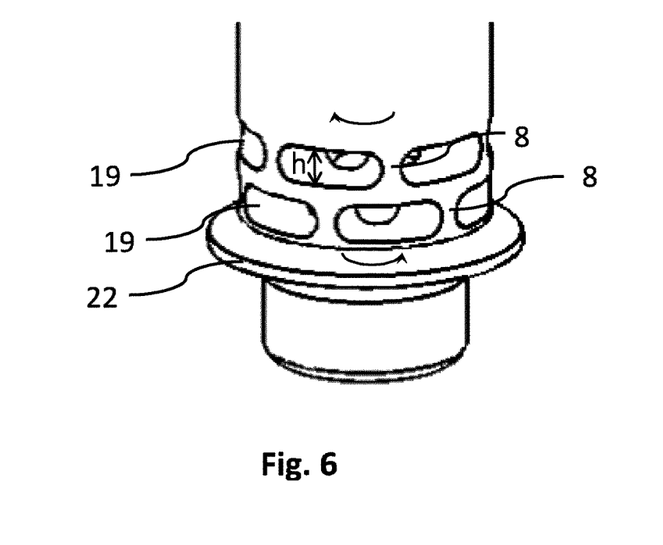
FIG. 6 an enlarged representation of the damping structure of the embodiment according to FIG. 2.

FIG. 6 shows an enlarged view of the damping structure 18 of the embodiment according to FIG. 2. The radially extending webs 8 divide the damping slots 19 of an upper and a lower row. The damping slots 19 of the upper row are offset by 30° relative to the damping slots 19 of the lower row. The height h and the position of the damping slots 19 are specifically selected so that a reversal of the torsional vibration direction results from a region above the upper row of damping slots 19 to a region below the lower row of damping slots and in particular of the stop flange 22 (shown schematically with arrows).

The invention claimed is:

1. An ultrasonic booster for a sonotrode for processing workpieces with ultrasonic vibrations,
    having a booster body with a longitudinal axis, the booster body having a sound input side with a first end face and a coupling side with a second end face for connection to the sonotrode,
    wherein longitudinal vibrations can be introduced into the booster body on the sound input side in a direction parallel to the longitudinal axis,
    wherein a conversion structure is arranged between the sound input side and the coupling side, by means of which torsional vibrations with a vibration component in a plane perpendicular to the longitudinal axis can be generated from the longitudinal vibrations,
    wherein a damping structure is provided between the conversion structure and the coupling side, which reduces the longitudinal vibrations on the coupling side, the damping structure being formed by a material weakening in the booster body.

2. The ultrasonic booster according to claim 1, wherein the booster body is completely or partially formed as a hollow body.

3. The ultrasonic booster according to claim 1, wherein the ultrasonic booster is provided, on the coupling side, with a connection interface.

4. The ultrasonic booster according to claim 1, wherein the ultrasonic booster is provided with a contour for a tool for connecting the ultrasonic booster to the sonotrode.

5. The ultrasonic booster according to claim 1, wherein the booster body is rotationally symmetrical.

6. The ultrasonic booster of claim 5, wherein the booster body has an outer diameter of less than one quarter of the longitudinal wavelength.

7. The ultrasonic booster according to claim 1, wherein the conversion structure is formed in the form of material recesses on the outer surface of the booster body, which extend along a helix.

8. The ultrasonic booster according to claim 1, wherein the material weakening of the damping structure is formed in the form of damping slots extending in a direction perpendicular to the longitudinal axis.

9. The ultrasonic booster of claim 1, wherein the damping structure is arranged adjacent to a region of a maximum proportion of torsional vibrations.

10. The ultrasonic booster according to claim 1, wherein the conversion structure extends over a length of about 10% to 30% of the length of the booster body.

11. The ultrasonic booster according to claim 1, wherein the conversion structure is arranged eccentrically between the damping structure and the first end face, as viewed in the longitudinal direction.

12. The ultrasonic booster according to claim 1, wherein a recess having a coupling surface for connecting to a vibrating surface of an ultrasonic converter is provided on the sound input side.

13. The ultrasonic booster according to claim 1, wherein a stop flange is provided on the outer surface of the booster body in the region of the second end face for stopping against a sound input surface of the sonotrode.

14. The ultrasonic booster according to claim 1, wherein the booster body is formed in one piece.

15. The ultrasonic booster according to claim 1, wherein the conversion structure, the damping structure, the sound introduction side, the length of the booster body and the second end face are formed and adapted to each other in such a way that the direction of vibration of the torsional vibrations on one side of the damping structure runs in the opposite direction of the torsional vibrations on the other side of the damping structure.

16. A device for processing workpieces by means of ultrasound, having an ultrasound booster according to claim 1 and a sonotrode, the sonotrode being connected to the coupling side of the ultrasound booster on a sound input side.

17. The device according to claim 16, wherein the sonotrode is provided with a holder and centering for a workpiece.

18. The device according to claim 17, wherein the holder and centering is fixed in a local torsional vibration minimum of the horn.

19. An apparatus according to claim 16, wherein the apparatus is further provided with a converter for introducing longitudinal vibrations into the sound input side, with a receptacle for a workpiece to be processed, and with an actuating device for moving the ultrasonic component towards the receptacle.

20. The device according to claim 7, wherein the material recesses are in the form of conversion slots.

* * * * *